United States Patent
Smith

[11] 3,884,929
[45] May 20, 1975

[54] SELECTED 3-TRICHLOROMETHYL-5-SUBSTITUTED 1,2,4-THIADIAZOLES

[76] Inventor: Eric Smith, P.O. Box 208, Farmington, Conn. 06032

[22] Filed: Oct. 29, 1973
(Under Rule 47)

[21] Appl. No.: 410,728

Related U.S. Application Data

[60] Continuation-in-part of Ser. No. 98,182, Dec. 14, 1970, abandoned, which is a division of Ser. No. 751,728, Aug. 12, 1968, Pat. No. 3,573,317.

[52] U.S. Cl....... 260/302 SD; 106/15; 260/45.8 SN; 260/306.8 D; 424/270
[51] Int. Cl............................................. C07d 91/60
[58] Field of Search............... 260/306.8 D, 302 SD

[56] References Cited
UNITED STATES PATENTS
3,260,725    7/1966   Schroedor.................... 260/306.8 D
3,324,141    6/1967   Bernstein..................... 260/306.8 D

*Primary Examiner*—Richard J. Gallagher
*Attorney, Agent, or Firm*—Robert L. Andersen

[57] ABSTRACT

Selected 3-trichloromethyl-5-substituted-1,2,4-thiadiazoles having the formula

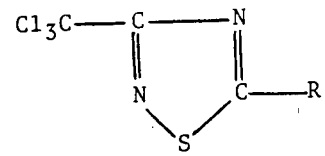

wherein R is m-haloanilino or N,N-di(lower alkyl) dithiocarbamoyl are prepared by reacting 3-trichloromethyl-5-chloro-1,2,4-thiadiazole with the appropriate active hydrogen-containing compound, or a metal salt thereof. These compounds are valuable biocides.

3 Claims, No Drawings

SELECTED 3-TRICHLOROMETHYL-5-SUBSTITUTED 1,2,4-THIADIAZOLES

This application is a continuation-in-part of co-pending application Ser. No. 98,182, filed Dec. 14, 1970, now abandoned, which was a divisional of Ser. No. 751,728, filed Aug. 12, 1968, now U.S. Pat. No. 3,573,317.

This invention relates to selectively substituted thiadiazoles having improved biocidal properties. More particularly, this invention relates to 3-trichloromethyl-5-substituted-1,2,4-thiadiazoles having the formula

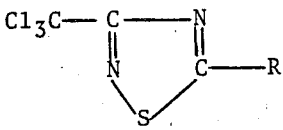

wherein R is m-haloanilino or N,N-di(lower alkyl)-dithiocarbamoyl.

Various 3-trichloromethyl-5-substituted-1,2,4-thiadiazoles have been previously prepared and reported in the literature. For example U.S. Pat. No. 3,260,725 discloses certain substituted thiadiazoles which are useful as soil fungicides.

Now it has been found in accordance with this invention that selectively substituted thiadiazoles having the formula I can be prepared which have improved biocidal properties.

The compounds I of this invention are prepared by reacting 3-trichloromethyl-5-chloro-1,2,4-thiadiazole with selected active-hydrogen containing compounds, or metal salts thereof, in accordance with the following general equation wherein R is as previously described and M is an inorganic cation such as an alkali or alkaline earth metal.

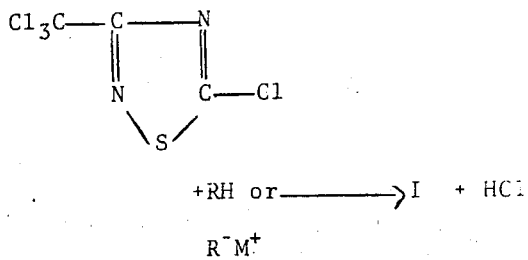

Illustrative compounds which can be employed in the preparation of the substituted thiadiazoles of this invention are those having the formula II wherein R is m-haloanilino or N,N-di(lower alkyl) dithiocarbamoyl.

Representative compounds II include such as m-haloanilines such as m-chloroaniline, m-bromoaniline and m-fluoroaniline and di(lower alkyl)-dithiocarbamates such as sodium diethyldithiocarbamate and sodium dibutyldithiocarbamate wherein the N-substituted di alkyl moieties each have 1–4 carbon atoms. Particularly preferred in the preparation of the thiadiazoles of this invention are compounds II where R is m-chloroanilino or N,N-diethyldithiocarbamoyl.

The 3-trichloromethyl-5-substituted-1,2,4-thiadiazoles I of this invention are readily prepared by reacting 3-trichloromethyl-5-chloro-1,2,4-thiadiazole with the appropriate co-reactant II at a temperature between about 0° and about 150°C., and preferably at a temperature between about 30°C. and about 120°C.

While the reaction will proceed in the absence of a solvent, it is preferred to employ solvents or inert dilutes in the preparation of the thiadiazoles I. Suitable solvents include acetone, water, methylethyl ketone, xylene, ethyl ether, chloroform, carbon tetrachloride and chlorobenzene.

Where a basic compound having the formula RH is employed as co-reactant II, an excess of the compound may be employed to pick up the hydrogen chloride evolved in the reaction. If a compound having the formula RH that is not strongly basic is employed, acid acceptors such as triethylamine, tributylamine, pyridine, dimethylaniline and the like can be used.

The 3-trichloromethyl-5-substituted-1,2,4-thiadiazoles I are obtained in high yield and excellent purity, and are readily isolated by conventional techniques such as filtration, distillation, recrystallization, and the like.

As previously mentioned, the 3-trichloromethyl-5-substituted-1,2,4-thiadiazoles I of this invention are valuable biocides. The efficiency of the compounds of this invention for this application was particularly surprising and unexpected since it was found that 3-trichloromethyl-5-ethoxy-1,2,4-thiadiazole was ineffective in certain applications where the compounds of this invention exhibited strong biocidal properties. For example, 3-trichloromethyl-5-(m-chloroanilino)-1,2,4-thiadiazole was effective against selected bacteria, all but one fungus and all algae tested at concentrations far below the minimum inhibitory level of 3-trichloromethyl-5-ethoxy 1,2,4-thiadiazole. Likewise, 3-trichloromethyl-5-(N,N-diethyldithiocarbamoyl)-1,2,4-thiadiazole substantially greater activity against all bacteria and most algae than did 3-trichloromethyl-5-ethoxy-1,2,4-thiadiazole. The improved biocidal activity of the compounds I over 3-trichloromethyl-5-ethoxy-1,2,4-thiadiazole is illustrated by the following results of comparative in vitro studies.

| ORGANISM | MINIMUM INHIBITORY CONCENTRATION (microgram/ml) for: | | |
|---|---|---|---|
| BACTERIA | A* | B** | C*** |
| S. aureus | 1,250 | 5 | 1,250 |
| S. lutea | 625 | 2.5 | 2,500 |
| S. faecalis | 1,250 | 625 | 20 |
| B. cereus | 625 | 5 | 1 |
| E. Coli | 1,250 | 625 | 2,500 |
| S. typhinmurium | 1,250 | 625 | 2,500 |
| Ps. aeruginosa | 1,250 | 625 | 2,500 |
| P. vulgaris | 625 | 2.5 | 5 |
| FUNGI | | | |
| A. niger | 1,250 | | 313 |
| P. pullularia | 1,250 | | 156 |
| P. vermiculatum | 1,250 | | 10 |
| C. resiniae | 1,250 | | 1,250 |
| T. mentagrophytes | 625 | | 1 |
| F. semitectum | 1,250 | | 20 |
| C. albicans | 1,250 | | 10 |
| S. cerevisiae | 625 | | 10 |
| ALGAE | | | |
| C. pyrenoidosa | 156 | 313 | 1 |
| S. obliguus | 156 | 5 | 1 |
| P. fareolarum | 156 | 39 | 1 |
| O. borneti | 5 | 39 | 1 |
| Zygnema | 78 | 20 | 1 |

| ORGANISM | MINIMUM INHIBITORY CONCENTRATION (microgram/ml) for: | | |
| --- | --- | --- | --- |
| BACTERIA | A* | B** | C*** |
| Diatoms | 156 | 313 | 39 |

*3-trichloromethyl-5-ethoxy-1,2,4-thiadiazole
**3-trichloromethyl-5-(N,N-diethyldithiocarbamoyl)-1,2,4-thiadiazole
***3-trichloromethyl-5-m-chloroanilino-1,2,4-thiadiazole Thus, the thiadiazoles I of this invention can be employed as biocides for paints, plastics, cements, and the like.

The following examples will serve to illustrate the preparation of various 3-trichloromethyl-5-substituted-1,2,4-thiadiazoles in accordance with the practice of this invention.

EXAMPLE I

3-Trichloromethyl-5-chloro-1,2,4-thiadiazole (23.80 g.) and m-chloroaniline (25.52 g.) were refluxed in 50 ml. of xylene for 2¼ hours. After cooling to room temperature, the reaction mixute was filtered and the filtrate evaporated to remove xylene. The resulting solid product was slurried with dilute hydrochloric acid, filtered, dried and recrystallized from cyclohexane to provide a product having a melting point of 149.5°–152°C. The following analytical data revealed that 3-trichloromethyl-5-(m-chloroanilino)-1,2,4-thiadiazole had been obtained.

| Anal. | |
| --- | --- |
| Calcd. for $C_9H_5Cl_4N_3S$: | C, 32.82; H, 1.53; Cl, 43.06; N, 12.76 |
| Found: | C, 331.2; H, 1.69; Cl, 42.8; N, 12.67 |

EXAMPLE II

3-Trichloromethyl-5-chloro-1,2,4-thiadiazole (23.80 g.) in 110 ml. of acetone was added to a solution of sodium diethyl dithiocarbamate trihydrate (22.5 g.) in 60 ml. water. After heating at 30°C. for 2½ hours, the reaction mixture was poured into excess water, thereby providing 24.0 g. of a solid product. Recrystallization from hexane provided crystals having a melting point of 101°–104°C. The following analytical data revealed that 3-trichloromethyl-5-(N,N-diethyldithiocarbamoyl)-1,2,4-thiadiazole had been obtained.

| Anal. Calcd. for $C_8H_{10}Cl_3N_3S_3$: | C, 27.39; H, 2.87; Cl, 30.33; N, 11.98; S, 27.42 |
| --- | --- |
| Found: | C, 27.56, H, 2.95; Cl, 30.7 ; N, 12.32; S, 27.67 |

What is claimed is:

1. A 3-trichloromethyl-5-substituted-1,2,4-thiadiazole having the formula

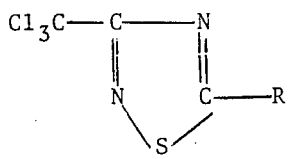

wherein R is m-haloanilino or N,N-di(lower alkyl having 1–4 carbons)-dithiocarbamoyl.

2. The compound of claim 1 having the same 3-trichloromethyl-5-(m-chloroanilino)-1,2,4-thiadiazole.

3. The compound of claim 1 having the name 3-trichloromethyl-5-(N,N-diethyldithiocarbamoyl)-1,2,4-thiadiazole.

* * * * *

UNITED STATES PATENT OFFICE
CERTIFICATE OF CORRECTION

Patent No. 3,884,929    Dated May 20, 1975

Inventor(s) Eric Smith

It is certified that error appears in the above-identified patent and that said Letters Patent are hereby corrected as shown below:

Column 3, line 5, "BACTERIA" should read --ALGAE--.

Column 4, line 36, "same" should read --name--.

Signed and Sealed this fifth Day of August 1975

[SEAL]

Attest:

RUTH C. MASON
Attesting Officer

C. MARSHALL DANN
Commissioner of Patents and Trademarks